July 18, 1933.　　　　F. H. MILLAR　　　　1,918,657
REEL FOR ELECTRIC CORD
Filed Sept. 15, 1930
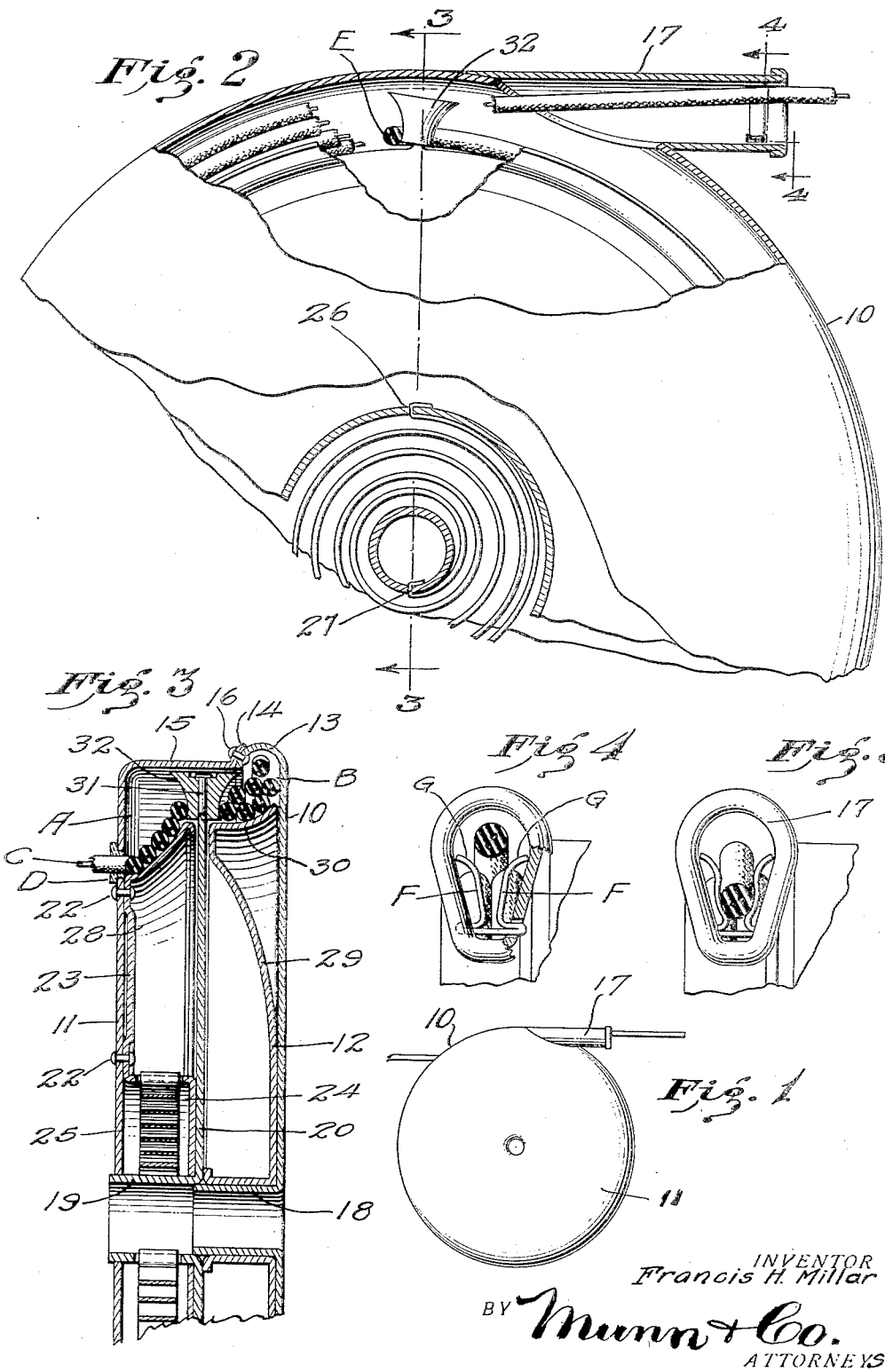
INVENTOR
Francis H. Millar
BY Munn + Co.
ATTORNEYS Patented July 18, 1933

1,918,657

UNITED STATES PATENT OFFICE

FRANCIS H. MILLAR, OF LOS ANGELES, CALIFORNIA

REEL FOR ELECTRIC CORD

Application filed September 15, 1930. Serial No. 482,018.

My invention relates to reels for electric cord and the like, and has for an object the provision of positively acting means so constructed and designed as to enable one to quickly pay out therefrom any desired portion of the length of cord that may be required for a particular purpose, depending entirely upon the position of an outlet with respect to the place where the cord finds attachment to an electrical fixture, while maintaining a surplus supply of the cord where it may be drawn upon at will.

Another object of the invention is to provide for effectively insuring a positive winding up of the cord or a paying out of same without the possibility of entanglement thereof.

A still further object of the invention resides in the provision of novel means for effecting a positive transfer of the cord from one section of the reel to another section thereof and for laying the cord in uniform spiral formation upon the respective sections, thereby insuring a smooth and uninterrupted movement of the cord when pull is applied thereto.

Another object of the invention is to provide a cord reel of the character set forth wherein tension is normally applied to the cord in a manner that will bring about an automatic winding up of the cord when one terminal of the latter has been disconnected from its equipment.

A still further object of the invention is to provide means functioning to hold a predetermined length of the cord in a withdrawn condition, so that it will not be affected by the normal tension placed upon it.

In the accompanying drawing,

Figure 1 is a view in side elevation of the reel;

Figure 2 is a view partly in side elevation and partly in section of a portion of the reel, the parts being shown on an enlarged scale;

Figure 3 is a section taken substantially on the line 3—3 of Figure 2;

Figure 4 is a section on line 4—4 of Figure 2, showing the cord released from its clamp; and Figure 5 is a view similar to Figure 4, showing the cord engaged by its clamp.

In carrying the invention into practice, use is made of a casing 10 which embodies sections 11 and 12 so associated that the whole is substantially of cylindrical configuration. The section 12 is provided with a peripheral bead or rolled portion 13 which is terminally associated with a flange 14 on the peripheral wall 15 of the section 11, the said flange 14 having detachable connection with the aforementioned rolled portion 13 by means of screws 16 or equivalent fastenings. At this point attention is directed to Figure 2 of the drawing, wherein it is observed that the said rolled portion 14 is provided with a tangentially disposed outlet tube 17 of relatively short length, the purpose of which will appear presently.

The section 12 is offset at the center to form an axial cylindrical bearing 18 which extends at one end partly into the hub 19 of a revolving disk 20. Riveted or otherwise suitably secured at 22 to the side wall of the section 11 is a member 23 preferably constructed of sheet material and formed at its center with a spring housing 24. Located within the housing is a spiral spring 25, and, as illustrated, one terminal of the spring is attached at 26 to the peripheral wall of the spring housing, while the opposite or inner terminal of the spring is correspondingly attached at 27 to the hub 19 of said disk 20. In this manner, the spring 25 functions to set up relative rotation between the disk 20 and the casing 10. The purpose of this arrangement will also be ascertained presently.

The member 23 is provided with a flared wall 28 which is slightly curved from a point immediately next to the disk 20 adjacent to the periphery of the latter, to the point where this wall joins the body of said member, as clearly indicated in Figure 3. On the opposite side of the disk 20 is a member 29, and as shown same is provided with a peripheral wall 30 which is also slightly curved and which is angularly related to the disk 20. Here it should be observed that the walls 28 and 30, just above referred to, are spaced from the peripheral wall 15 of the casing 10. It also should be noted that the disk 20 has a radial bearing pin 31 which extends in a direction toward the peripheral wall 15. This bearing pin revolubly accommodates a substantially frusto-conical pulley 32, the restricted diameter of which faces the axis of rotation of the disk.

The construction described so far is such that the casing 10 is virtually divided into two compartments A and B, which are intercepted by the pulley 32. It manifestly follows that through this arrangement of parts the pulley is intended to co-act with the members 23 and 29, respectively, during the work of paying cord from the reel or when winding the cord thereupon. Functionally, the pulley serves to effect a transfer of the cord from the compartment A to the compartment B and vice versa, by virtue of the spring 25 as concerns the automatic winding up of the cord or by the action of the pulley when manually applied to the cord against the action of said spring.

An electrical conductor, such as the cord C, extends through an insulated aperture D formed at one side of the section 11, preferably near the low side of the angle which marks the position of the surface or peripheral portion 28 of the member 23. The cord is then wrapped spirally around the wall 28, and in like manner is spirally wound around the wall 30 of the member 29, there being a bight portion E formed in an intermediate section or somewhere in the length of the cord, which bight portion maintains association with the transferring pulley 32, so that when the disk 20 is revolved, the device functions as though the cord were engaged by one's finger and spirally laid in position. In this manner I am able to prevent entanglement of the cord during the time of paying same from the reel or when winding the cord to the positions shown in Figure 3. Now, it should be noted that the compartment B communicates constantly with the tangentially disposed outlet tube 17 from which one turn of the cord is always exposed. The terminal of the cord which is exposed from the tube 17 is intended to be provided with any well-known form of electrical connector that will place an electrical contrivance to which the cord is connected in circuit with any ordinary line of current. The cord terminal which proceeds from the insulated aperture D is intended to be provided with a plug or other form of connector which may be incorporated in a socket of a line.

It obviously follows that the cord is constantly influenced or tensioned by the spring 25 so that the normal action is to effect a winding of the cord upon the reel. Appreciating that there is a constant tension upon all that cord occupying a position externally of the tube 17, it is desirable to provide means within the tube that will resist the action of said spring after a desired length of cord has been paid out from the reel. I, therefore, provide means within the tube 17 which is preferably in the form of a spring clip having mating jaws F, F, flared out at G. The cord normally occupies a position within the tube where it is not engaged by the jaws F, F. After one withdraws an intended length of cord from the reel, slight lateral movement set up between the cord and the tube 17 by manual manipulations will interpose the cord between the jaws F, F, and the latter will then secure the cord and prevent tension being put upon that length which extends outwardly from the said tube 17.

I claim as my invention:

A device of the class described comprising two relatively revoluble bodies of approximately corresponding diameters, each having a flared peripheral surface, the peripheral surface of one body merging onto the peripheral surface of the other said body, the said bodies being separated from each other to define a relatively narrow space therebetween, a rotary disk occupying the said space between the bodies, a pulley mounted at the periphery of the disk and having a surface extending laterally towards the peripheral surfaces of the respective bodies, and a coil spring having one end attached to the disk at the axis of rotation thereof and its other end attached to one of said bodies.

FRANCIS H. MILLAR.